United States Patent
Barth et al.

(10) Patent No.: US 8,912,923 B2
(45) Date of Patent: Dec. 16, 2014

(54) METHOD AND DEVICE FOR PARKING ASSISTANCE FOR A VEHICLE

(75) Inventors: Harald Barth, Korntal-Munchingen (DE); Nicolas Jecker, Esslingen (DE)

(73) Assignee: VALEO Schalter und Sensoren GmbH, Bietigheim-Bissingen (DE)

(*) Notice: Subject to any disclaimer, the term of this patent is extended or adjusted under 35 U.S.C. 154(b) by 770 days.

(21) Appl. No.: 12/996,153

(22) PCT Filed: Jun. 9, 2009

(86) PCT No.: PCT/EP2009/004134
§ 371 (c)(1), (2), (4) Date: Dec. 3, 2010

(87) PCT Pub. No.: WO2009/152977
PCT Pub. Date: Dec. 23, 2009

(65) Prior Publication Data
US 2011/0093168 A1   Apr. 21, 2011

(30) Foreign Application Priority Data
Jun. 17, 2008   (DE) .......................... 10 2008 028 763

(51) Int. Cl.
*B60Q 1/48*   (2006.01)
(Continued)

(52) U.S. Cl.
CPC .......... *B62D 15/0285* (2013.01); *B62D 15/028* (2013.01); *G08G 1/14* (2013.01); *G08G 1/16* (2013.01); *G08G 1/168* (2013.01); *B60T 2201/10* (2013.01)
USPC .......................................... 340/932.2; 701/41

(58) Field of Classification Search
CPC ......... G08G 1/14; G08G 1/144; G08G 1/146; G08G 1/147; G08G 1/168; B62D 15/028; B62D 15/0285; B60T 2201/10

USPC ............. 701/41, 1, 517; 340/932.2, 436, 932, 340/943, 937, 908; 180/271
IPC ............. G08G 1/14, 1/144, 1/146, 1/147, 1/168
See application file for complete search history.

(56) References Cited

U.S. PATENT DOCUMENTS 5,669,753 A * 9/1997 Schween ........................ 414/800
7,095,361 B2   8/2006 Mattes et al.
(Continued)

FOREIGN PATENT DOCUMENTS

CN   1771442 A   5/2006
DE   100 41 381 A1   4/2001
(Continued)

OTHER PUBLICATIONS

International Search Report w/translation from PCT/EP2009/004134 dated Sep. 22, 2009 (6 pages).
(Continued)

*Primary Examiner* — Khoi Tran
*Assistant Examiner* — Rachid Bendidi
(74) *Attorney, Agent, or Firm* — Osha Liang LLP

(57) ABSTRACT

The invention relates to a method and a device for assisting a parking process of a vehicle (1) into a parking space (P) which is arranged transversely with respect to a carriageway (F) and which is bounded on at least one side by a lateral boundary (10, 11), wherein the parking space (P) is measured by means of a measuring device, a parked position (G) of the vehicle (1) inside the parking space (P) is defined by means of an evaluation device, and a parking path (B) of the vehicle (1) into the parked position (G) is determined by means of the evaluation device.

Figure 1:
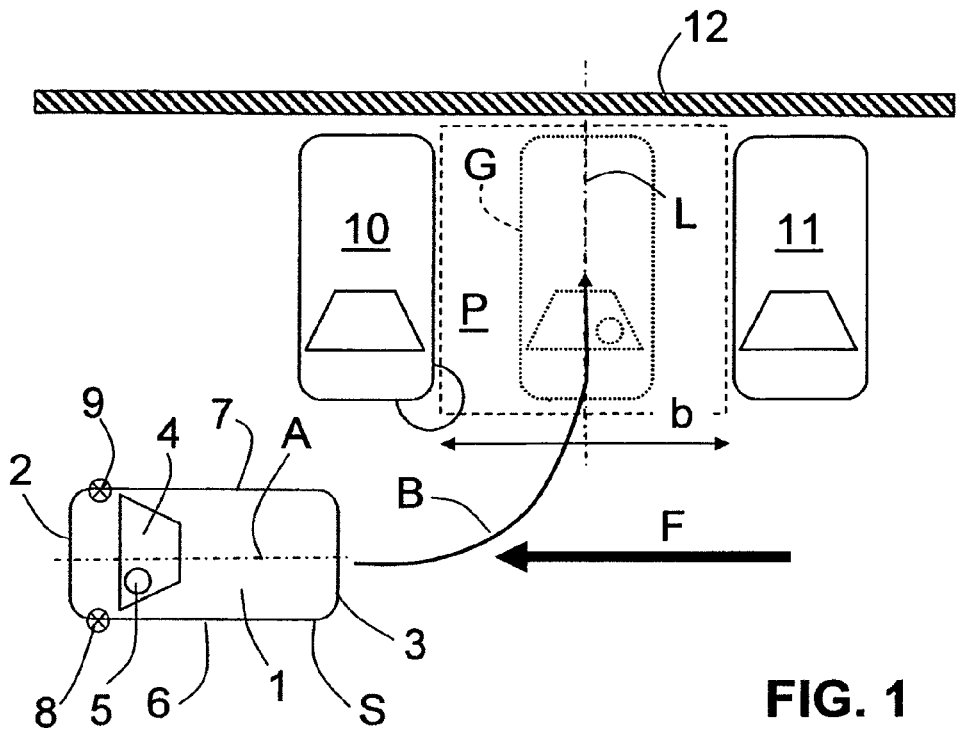

In order to assist the parking process in very wide parking spaces (P), the parked position (G) is defined at a lateral distance (d) from the center longitudinal axis (L) of the parking space (P) by the evaluation device at least when a predefined minimum width (b-min) of the parking space (P) is exceeded.

10 Claims, 2 Drawing Sheets

(51) Int. Cl.
*G08G 1/14* (2006.01)
*B62D 15/02* (2006.01)
*G08G 1/16* (2006.01)

(56) References Cited

U.S. PATENT DOCUMENTS

| | | | |
|---|---|---|---|
| 7,469,765 B2* | 12/2008 | Spannheimer et al. | 180/204 |
| 7,498,954 B2* | 3/2009 | Boss et al. | 340/932.2 |
| 8,130,120 B2* | 3/2012 | Kawabata et al. | 340/908 |
| 2003/0160717 A1 | 8/2003 | Mattes et al. | |
| 2005/0236201 A1* | 10/2005 | Spannheimer et al. | 180/204 |
| 2005/0285758 A1 | 12/2005 | Matsukawa et al. | |
| 2007/0010918 A1* | 1/2007 | Shimazaki et al. | 701/1 |
| 2007/0282489 A1* | 12/2007 | Boss et al. | 701/2 |
| 2010/0156671 A1* | 6/2010 | Lee et al. | 340/932.2 |
| 2011/0080305 A1* | 4/2011 | Toledo et al. | 340/932.2 |
| 2011/0082613 A1* | 4/2011 | Oetiker et al. | 701/25 |

FOREIGN PATENT DOCUMENTS

| | | |
|---|---|---|
| DE | 101 20 511 A1 | 6/2002 |
| DE | 10 2005 037 468 A1 | 2/2007 |
| JP | 2003-246248 A | 9/2003 |
| WO | 02/075354 A1 | 9/2006 |
| WO | WO 2007017351 A1 * | 2/2007 |

OTHER PUBLICATIONS

Office Action issued in Chinese Application No. 200980122918.0, mailed on Sep. 6, 2012, with English translation thereof (14 pages).
Office Action issued in Japanese Application No. 2011-513916, mailed on Sep. 3, 2013, with English translation thereof (5 pages).

* cited by examiner

METHOD AND DEVICE FOR PARKING ASSISTANCE FOR A VEHICLE

The invention relates to a method and to a device for assisting a parking process of a vehicle into a parking space which is arranged transversely with respect to a carriageway, of the type specified in the preamble of claims 1 and 8, respectively.

DE 10 2005 037 468 A1 has already disclosed such a method and an associated device. The method for assisting the parking process comprises the steps: measurement of the parking space by means of a parking space-measuring device, definition of a parked position of the vehicle inside the parking space by means of an evaluation device and determination of parking paths of the vehicle into the parked position by means of an evaluation device. In this context, a plurality of suitable single-manoeuvre or multi-manoeuvre parking paths into the parked position can be determined by the evaluation device, from which parking paths the driver then selects the desired parking path by means of an evaluation device. The parked position is defined here by the evaluation device in such a way that the centre longitudinal axis of the vehicle in the parked position corresponds essentially to the centre longitudinal axis of the parking space.

This definition has the disadvantage that in very wide parking spaces no optimum parked position is achieved and it is not possible for the parking process to be assisted if a parking space is bounded on only one side by obstacle.

The object of the invention is to further develop a method and a device for assisting a parking process of a vehicle into a parking space which is arranged transversely with respect to a carriageway and is of the type mentioned in the preamble of claims 1 and 8, respectively, to the effect that the assistance of the parking process is improved for wide parking spaces.

This object is achieved according to the invention by means of a method according to claim 1 and by means of a device according to claim 8. Further features which advantageously embody the invention are contained in the subclaims.

The advantage which is achieved with the invention is that even in very wide parking spaces an optimum parked position can be achieved since the parked position is defined at a lateral distance from the centre longitudinal axis of the parking space by the evaluation device at least when a predefined minimum width of the parking space is exceeded. As a result of the off-centre arrangement of the vehicle in the parked position, an enlarged distance remains next to one side of the vehicle in very wide parking spaces, which distance can be used, for example, for particularly comfortable exiting by the driver or for parking at least one further vehicle in the parking space.

If the width of the parking space is smaller than or equal to the minimum width, the parked position is preferably arranged approximately on the centre longitudinal axis of the parking space, i.e. in the parked position the centre longitudinal axis of the vehicle corresponds essentially to the centre longitudinal axis of the parking space, with the result that a uniform space for entering and exiting by the vehicle occupants is available next to the two sides of the vehicle.

The predefined minimum width of the parking space, the exceeding of which causes the evaluation unit to define an off-centre parked position, is preferably dimensioned here in such a way that at least one further passenger car of a customary width can be parked laterally next to the vehicle within the parking space.

The vehicle is therefore arranged approximately centrally on the parking space provided that a predefined minimum width of the parking space is not exceeded and the parking space is under normal circumstances sufficient merely for parking the vehicle, in order to make available the same distance for exiting by vehicle occupants on the driver's side and on the front seat passenger's side. If the predefined minimum width of the parking space is exceeded, the vehicle is arranged off centre in the parking space in the parked position in order to be able to park a further vehicle of a customary width next to the vehicle. As a result, an optimum parked position can be achieved both for parking spaces with a very large width and for parking spaces with a normal width.

The lateral distance between the parked position and the centre longitudinal axis of the parking space can be defined particularly reliably by the evaluation unit in such a way that the vehicle is arranged in its parked position with one side of the vehicle at a predefined lateral distance from the boundary which bounds the parking space laterally. In this method, an appropriate parked position can be defined if the width of the parking space is so large that a lateral boundary is detected by the measuring device merely on one side of the parking space.

If the parking space is bounded on both sides by, in each case, one associated boundary, the parked position can be defined by the evaluation unit in such a way that in the parked position the front seat passenger's side of the vehicle is arranged at a predefined lateral distance from the adjacent boundary. As a result, a minimum distance can be predefined on the front seat passenger's side, while an enlarged distance for particularly comfortable exiting remains on the driver's side of the vehicle.

Alternatively, in parking spaces which are bounded on both sides by, in each case, one associated boundary, the parked position can also be defined in such a way that in its parked position the vehicle is arranged at a predefined lateral distance from the boundary which is closest to the vehicle at the start of the parking process. As a result, a particularly simple and quick parking process can be achieved.

In order to permit a particularly reliable and comfortable parking process, steering of the vehicle during the parking process can be actuated by the evaluation unit in accordance with the parking path.

In order to assist the parking process, information relating to the guidance of the vehicle along the parking path can also be conveyed to the driver via an output device.

An exemplary embodiment of the invention will be explained in more detail below on the basis of a figurative illustration.

In the illustration, in each case in a schematic view:

FIGS. 1-4 show the parking process of a vehicle in various parking spaces which are each arranged transversely with respect to a carriageway.

FIGS. 1-4 each show in a schematic plan view parking processes of a motor vehicle 1 into parking spaces P which are each arranged transversely with respect to a carriageway F. The parking spaces P are bounded laterally by at least one obstacle in the form of a parked car 10 and/or 11, by the carriageway F on the front side and by a kerb stone 12 on their rear edge facing away from the carriageway F.

The parking spaces P therefore have overall an essentially rectangular shape with a width b, wherein the centre longitudinal axis L of each parking space P extends approximately parallel to the lateral edges of the parking space P and therefore essentially perpendicularly with respect to the carriageway F at half the width distance.

However, the method according to the invention and the device according to the invention are not restricted to parking spaces with parallel straight edges. As a result, the width of the parking space can be determined, for example, as a maximum, minimum or projected distance between the lateral boundaries of the parking space if the lateral edges of the parking space have an angular or curved profile, wherein the centre longitudinal axis of the parking space then extends correspondingly perpendicularly with respect to the carriageway F in the centre of the width extent of the parking space.

The motor vehicle 1 which is embodied as a passenger car has a front region 2 and a rear region 3 as well as a driver's place 5 which is arranged behind a windscreen 4. In the case of the motor vehicle 1 which is embodied as a left-hand drive vehicle, the driver's place 5 is arranged on the left-hand side of the vehicle so that the left-hand side of the vehicle forms a driver's side 6 and the right-hand side of the vehicle forms a front seat passenger's side 7 of the motor vehicle 1. The centre longitudinal axis A of the motor vehicle extends at half the width distance between the driver's side 6 and front seat passenger's side 7 in the longitudinal direction of the motor vehicle 1.

The motor vehicle 1 comprises a device for assisting a parking process having a measuring device and an evaluation device (not shown). The measuring device comprises two lateral distance sensors 8 and 9 which are each arranged near to the front region 2 on the driver's side 6 and/or front seat passenger's side 7 of the motor vehicle 1. The distance sensors 8 and 9 are embodied as ultrasonic sound distance sensors, known per se, and are each arranged at a lateral distance from a front bumper (not shown) of the motor vehicle 1. Alternatively, the distance sensors 8 and 9 could, however, also be arranged near to the rear region 3 of the vehicle, for example on a rear bumper.

The distance sensors 8 and 9 and a travel sensor (not shown) for determining a travel path of the motor vehicle are connected to a control unit (not shown) which actuates the distance sensors 8 and 9 in such a way that when the motor vehicle 1 travels along the carriageway F, the width b of the parking space P is measured. Furthermore, further geometric data such as the depth and the orientation of the parking space relative to the carriageway F can also be determined by measurement. The width b and the possibly determined additional geometric data can be transmitted to an evaluation unit which is preferably embodied integrally with the control unit. The evaluation unit comprises a program code for firstly defining a parked position G of the motor vehicle 1 within the parking space P on the basis of the width b of the parking space P and for subsequently determining a parking path B from a starting position S of the motor vehicle 1, along which parking path the motor vehicle 1 is driven into its parked position G.

The evaluation unit is connected here via a bus system of the motor vehicle 1 to a steering system (not shown) of the motor vehicle 1 in order to actuate the steering during the parking of the motor vehicle 1 in such a way that the motor vehicle 1 is moved from the starting position S along the parking path B into its parked position G. The longitudinal control of the motor vehicle 1, i.e. accelerating and braking, is performed here by the driver himself. Alternatively, the evaluation unit could, however, also be connected via the data bus system to the engine controller and brake of the motor vehicle 1 in order to permit a fully autonomous parking process.

In addition, the evaluation unit is provided for outputting to the driver information relating to the parking process via an output device, for example a display and/or sound generator arranged in the passenger compartment of the vehicle. In this context, it is possible to convey to the driver, for example, instructions relating to the longitudinal control of the motor vehicle 1 but also relating to the steering towards the starting position S. Furthermore, the driver can also be provided with instructions relating to the steering of the motor vehicle 1. In this context it is possible to convey to the driver instructions relating to the manual setting of specific steering angles so that the parking process is performed manually by the driver on the basis of the steering instruction of the output device. It is possible to dispense with actuation of the steering by the evaluation device here.

The definition of the parked position G of the motor vehicle 1 within the parking space P is carried out by means of the program code of the evaluation device on the basis of the following sequence:

Comparison of the width b1 of the parking space P which is transferred by the measuring device with a predefined minimum width b-min which is stored in the evaluation device.

If the width b is less than or equal to the minimum width b-min, a parked position G which is essentially at no distance from the centre longitudinal axis L of the parking space P is defined, i.e. in the parked position G the centre longitudinal axis A of the motor vehicle 1 extends approximately congruently with respect to the centre longitudinal axis L of the parking space P.

If the width b is greater than the minimum width b-min, an alternative parked position G which is at a distance d from the centre longitudinal axis L of the parking space P is defined, i.e. in the alternative parked position G the centre longitudinal axis A of the motor vehicle 1 extends parallel at a distance d from the centre longitudinal axis L of the parking space P.

The minimum width b-min is predefined in such a way that given a parking space with the minimum width b-min two vehicles with a customary width can be parked one next to the other in the parking space, wherein entry and exiting by the vehicle occupants is still to be possible. The minimum width b-min corresponds here to approximately 2.5 times the vehicle width of the motor vehicle 1.

When the predefined minimum width b-min is exceeded, the parked position G is determined in such a way that the motor vehicle 1 is arranged in the parked position G with a side 6 or 7 of the vehicle at a predefined distance a1, stored in the evaluation unit, from the adjacent boundary of the parking space P. In this context, according to the program code of the evaluation unit, the front seat passenger's side 7 of the motor vehicle 1 is, where possible arranged, at a distance a1 from the adjacent boundary. However, if no corresponding lateral boundary is detected by the measuring device next to the front seat passenger's side i.e. the parking space P is either very wide or is bounded laterally only on one side, the parked position G is defined by the evaluation unit in such a way that the driver's side 6 of the motor vehicle 1 is arranged in the parked position G at a predefined distance a2, stored in the evaluation unit, from the adjacent boundary.

Alternatively, the program code of the evaluation unit can, however, also be configured in such a way that the parked position G of the motor vehicle 1 is always defined starting from the starting position S of the motor vehicle 1 when the minimum width b-min is exceeded, in such a way that in the parked position G the motor vehicle 1 is arranged at a predefined lateral distance from the obstacle 10 or 11 which, at the start of the parking process, is at the shorter distance from the motor vehicle 1 or can be achieved with the smallest number of parking manoeuvres. In this context, the driver of the motor vehicle 1 can influence the definition of the parked position G by a corresponding predefinition of the staring position S. However, in addition it would also be possible to influence the parked position G by a selection means, which is to be activated by the driver, or by a steering intervention of the driver during the parking process.

The details relating to the parked position G apply correspondingly with their sides reversed for right-hand drive motor vehicles in which the right-hand side of the vehicle forms the driver's side.

In order to park in a parking space P, the driver firstly steers the motor vehicle 1 transversely past the parking space P along the carriageway F. As the vehicle drives past, the width b and, if appropriate, other geometric data of the parking space P are determined by the measuring device by means of the lateral distance sensor 9 and the travel sensor (not shown). The data are transmitted from the measuring device to the evaluation unit which then defines a starting position S for the parking process, the parked position G of the motor vehicle 1 inside the parking space P, and a parking path B. After the parking space P has been passed, the motor vehicle 1 is temporarily stopped by the driver in a starting position S, wherein the evaluation unit indicates to the driver via the central display of the motor vehicle 1 that a possible starting position S has been reached.

After the motor vehicle 1 stops in the starting position S the driver initiates the parking process via engaging a reverse gear. In the process, the driver controls the velocity of the motor vehicle 1 by accelerator interventions and braking interventions, while the evaluation device automatically activates the steering in accordance with the parking path B via the bus system of the motor vehicle 1. The motor vehicle 1 then travels in reverse starting from the starting position S along the parking path B into its parked position G.

A more detailed explanation will be given below of parking processes of the motor vehicle 1 into parking spaces P with a different width, on the basis of FIGS. 1-4.

The parking space P according to FIG. 1 is bounded on each of its two sides lying opposite one another in each case by a parked vehicle 10 or 11. The width b of the parking space P, which corresponds to the distance between the two vehicles 10 and 11, has here a value less than the predefined minimum width b-min. The parked position G of the motor vehicle 1 is therefore arranged by the evaluation unit on the centre longitudinal axis L of the parking space P, i.e. in the parked position G illustrated by dashed lines in FIG. 1, the motor vehicle 1 is arranged in such a way that its centre longitudinal axis A extends approximately congruently with respect to the centre longitudinal axis L of the parking space P. In the parked position G, there is therefore approximately the same distance from the adjacent parked vehicle 10 or 11 available laterally next to the driver's 6 and the front seat passenger's side 7, as a result of which comfortable entry and exiting is possible for the driver and front seat passenger.

Figure 2:
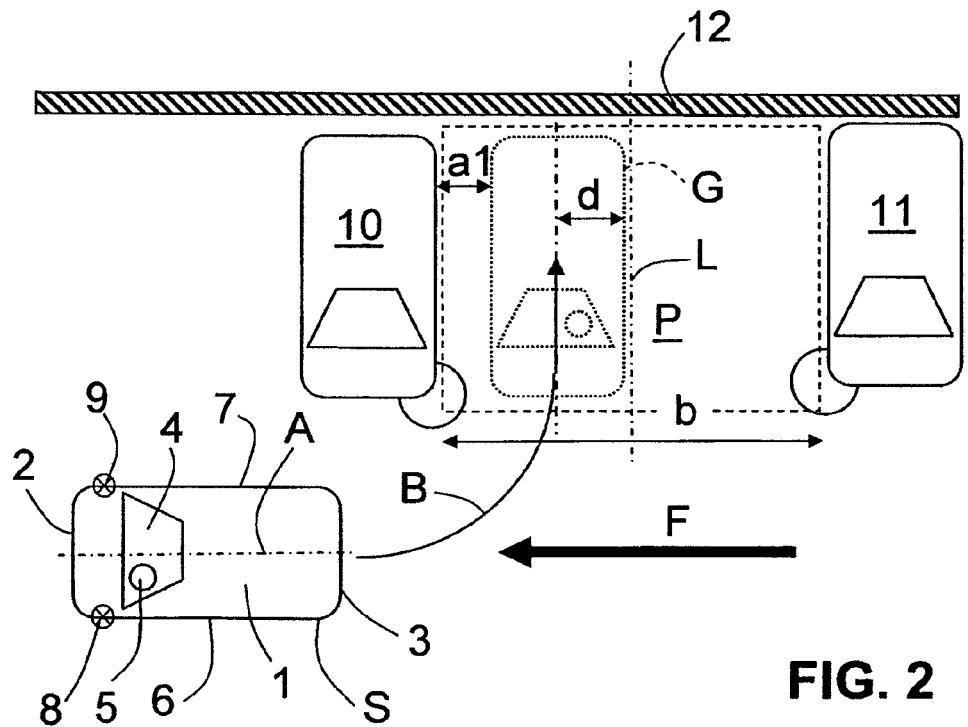

FIG. 2 illustrates a parking process of the motor vehicle 1 into a parking space P which is also bounded on two sides lying opposite one another in each case by a parked vehicle 10 or 11, wherein the width b of the parking space P is greater than the minimum width b-min. The evaluation unit therefore defines a parked position G which is arranged at a distance d from the centre longitudinal axis L of the parking space P, i.e. in the parked position G illustrated by dashed lines in FIG. 2, the centre longitudinal axis A of the motor vehicle 1 extends essentially parallel at a distance d with respect to the centre longitudinal axis L of the parking space P.

The parked position G is defined here in such a way that in its parked position G the motor vehicle 1 is arranged with its front seat passenger's side 7 at a predefined distance a1, stored in the evaluation unit, from the adjacent parked vehicle 10. The distance a1 is dimensioned here in such a way that in the parked position G of the motor vehicle 1 entry and exiting of vehicle occupants on the front seat passenger's side 7 of the motor vehicle 1 is possible. FIG. 2 shows clearly that a further motor vehicle with a customary width can also be parked laterally next to the motor vehicle 1 in the parked position G of the motor vehicle 1.

Figure 3:
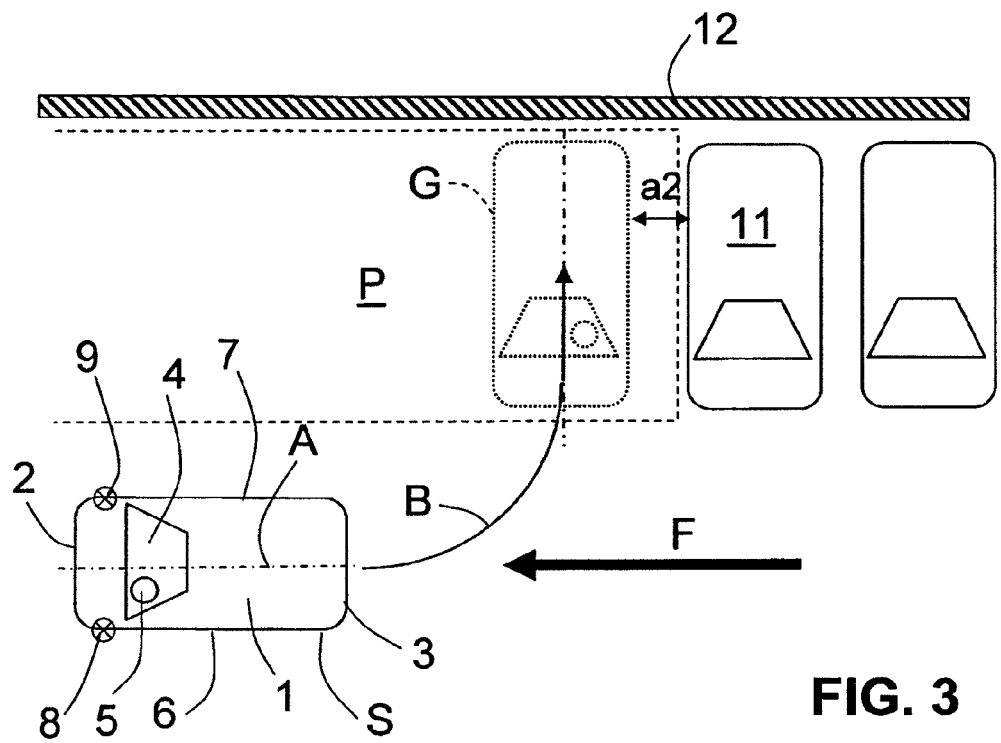

FIG. 3 shows a parking process of the motor vehicle 1 into a parking space P which is bounded by a parked vehicle 11 on the front side viewed in the forward direction of travel of the motor vehicle 1. On the opposite side, the parking space P is bounded either by a distant obstacle arranged outside FIG. 3 or by no obstacle at all.

This means that for the device for assisting the parking process there is no difference whether the obstacle is arranged at a distance, i.e. outside the range of the distance sensor 9, or whether there is no lateral boundary of the parking space P at all present on this side of the parking space P since in both cases no second lateral obstacle is detected by the device. However, the measuring device of the motor vehicle 1 detects in any case, on the basis of the travel path sensor and distance measurements of the distance sensor 9, that no second obstacle is detected along a certain travel path along the carriageway F behind the parked vehicle 11 and the parking space P has a sufficient width for an assisted parking process. Then, after a starting position S which is determined by the evaluation device has been reached, it is indicated to the driver by means of the output device that an assisted parking process is possible.

After it has been determined that an assisted parking process is possible, the evaluation device defines the parked position G within the parking space P. Since the width of the parking space P is larger than the minimum width b-min, the parked position G is defined at a distance from the longitudinal centre axis of the parking space P by the evaluation device. The parked position G is defined here in such a way that in its parked position G the motor vehicle 1 is arranged at a predefined distance, stored in the evaluation device, from the single detected lateral boundary of the parking space P, i.e. in its parked position G illustrated by dashed lines in FIG. 3, the driver's side 6 of the motor vehicle 1 is arranged at a distance a2 from the adjacent parked vehicle 11. The distance a2 is dimensioned here in such a way that sufficient space for entry and exiting by the driver is also available next to the driver's side 6.

Figure 4:
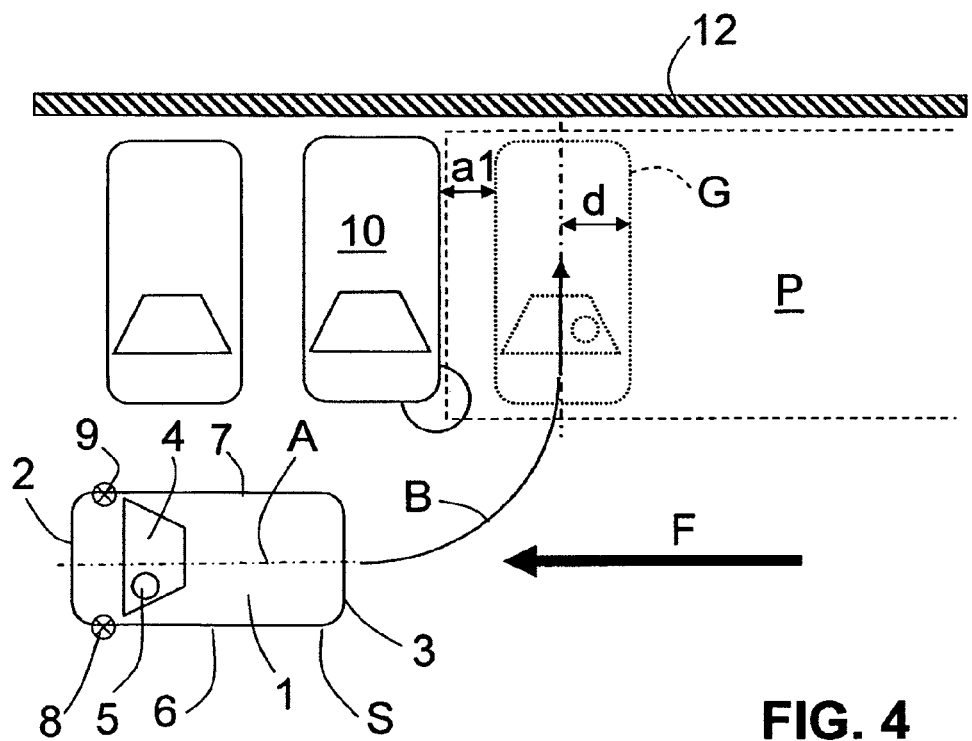

FIG. 4 shows a parking process into a parking space P which is bounded by a parked vehicle 10 along the carriageway F on the rear side viewed in the direction of forward travel of the motor vehicle 1. The opposite side of the parking space P can either be bounded by no boundary or by a distant lateral boundary which is arranged outside the illustration. In any case, no obstacle is detected when the parking space P is passed by the motor vehicle 1 along the carriageway F for a certain distance in front of the parked vehicle 10, and it is detected by the evaluation unit that a parking space P with sufficient width for an assisted parking process is available.

Since the width of the parking space P is greater than the minimum width b-min, the parked position G is defined by the evaluation device at a distance from the centre longitudinal axis of the parking space P. The parked position G is defined here in such a way that in its parked position G the motor vehicle 1 is arranged at a predefined distance, stored in the evaluation device, either from the single detected lateral boundary or from the lateral boundary of the parking space P which is at the shortest distance from the motor vehicle 1 in the starting position S for the parking process. In its parked position G illustrated by dashed lines in FIG. 4, the motor vehicle 1 is therefore arranged with its front seat passenger's side 7 at a distance a1 from the adjacent parked vehicle 10. The distance a1 is dimensioned here in such a way that a sufficient space for entry and exiting by the front seat passenger is also available next to the front seat passenger's side 7.

The invention claimed is:

1. A method for assisting a parking process of a vehicle into a parking space which is arranged transversely with respect to a carriageway and which is bounded on both sides by, in each case, one associated boundary, the method comprising:
measuring the parking space using a measuring device;
defining a parked position of the vehicle inside the parking space using an evaluation device; and
determining a parking path of the vehicle into the parked position using the evaluation device,
Wherein the evaluation device is configured to compare the measured space from the measuring device with a predefined minimum width stored in the evaluation device,
determine a parked position at a negligible distance from a center longitudinal axis of the parking space when the width of the parking space is less than or equal to the predefined minimum width,
determine a parked position at a lateral distance from the center longitudinal axis of the parking space when the width of the parking space exceeds the predefined minimum width.

2. The method according to claim 1,
wherein the minimum width of the parking space is dimensioned in such a way that at least one further passenger car of a customary width can be parked next to the vehicle within the parking space.

3. The method according to claim 1,
wherein the lateral distance between the parked position and the center longitudinal axis of the parking space is defined by the evaluation unit in such a way that the vehicle is arranged in the parked position with one side of the vehicle at a predefined lateral distance from the lateral boundary.

4. The method according to claim 3,
wherein the parked position is defined by the evaluation unit in such a way that in the parked position the vehicle is arranged with a front seat passenger's side at a predefined lateral distance from an adjacent boundary of the associated boundaries.

5. The method according to claim 3,
wherein the parked position is defined by the evaluation unit in such a way that in the parked position the vehicle is arranged at a predefined lateral distance from the associated boundary which is closest to the vehicle at the start of the parking process.

6. The method according to claim 1,
wherein steering of the vehicle during the parking process is actuated by the evaluation unit in accordance with the parking path.

7. The method according to claim 1,
wherein during the parking process information relating to the guidance of the vehicle along the parking path is conveyed to a driver of the vehicle via an output device.

8. A device for assisting a parking process of a vehicle into a parking space which is arranged transversely with respect to a carriageway and which is bounded on both sides by boundary, the device comprising:
a measuring device for measuring the parking space; and
an evaluation device for defining a parked position of the vehicle inside the parking space and for determining a parking path of the vehicle into the parked position,
wherein the evaluation device comprises a processor for:
comparing the measured space from the measuring device with a predefined minimum width stored in the evaluation device,
determining a parked position at a negligible distance from a center longitudinal axis of the parking space when the width of the parking space is less than or equal to the predefined minimum width,
determining a parked position at a lateral distance from the center longitudinal axis of the parking space when the width of the parking space exceeds the predefined minimum width.

9. The device according to claim 8,
wherein steering of the vehicle is actuated using an evaluation unit to control the steering in accordance with the parking path during the parking process.

10. The device according to claim 8,
further comprising an output device for conveying to a driver information relating to the guidance of the vehicle along the parking path during the parking process.

* * * * *